(12) United States Patent
Mazumdar

(10) Patent No.: US 8,466,636 B2
(45) Date of Patent: Jun. 18, 2013

(54) EXCAVATOR DRIVE SYSTEM WITH BI STATE MOTOR TRANSFER SWITCHES

(75) Inventor: Joy Mazumdar, Norcross, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 494 days.

(21) Appl. No.: 12/897,115

(22) Filed: Oct. 4, 2010

(65) Prior Publication Data

US 2012/0079821 A1   Apr. 5, 2012

(51) Int. Cl.
*H02P 1/54*   (2006.01)

(52) U.S. Cl.
USPC .......... 318/34; 318/35; 318/139; 318/400.26; 318/520; 37/246; 172/225; 172/791; 172/315; 172/453; 212/284; 180/65.275

(58) Field of Classification Search
USPC ................ 318/34, 35, 51, 74, 103, 118, 139, 318/671, 672, 673, 400.21, 400.26, 430, 318/432, 520, 801; 172/2, 3, 225, 791, 315, 172/453, 471, 510, 580, 663; 173/217; 280/766.1, 828; 212/284; 335/11, 30; 180/65.275
See application file for complete search history.

(56) References Cited

U.S. PATENT DOCUMENTS

| | | | |
|---|---|---|---|
| 4,776,751 A | 10/1988 | Saele | |
| 5,352,965 A * | 10/1994 | Kawabata | 318/807 |
| 7,832,126 B2 * | 11/2010 | Koellner et al. | 37/348 |
| 8,186,465 B2 * | 5/2012 | Oyobe et al. | 180/65.275 |
| 8,362,721 B2 * | 1/2013 | Jylha | 318/139 |
| 2005/0122068 A1 | 6/2005 | Ichimura | |

FOREIGN PATENT DOCUMENTS

| | | |
|---|---|---|
| EP | 1455439 A1 | 9/2004 |
| JP | 2006246631 A | 9/2006 |

OTHER PUBLICATIONS

PCT International Search Report mailed Nov. 22, 2011 corresponding to PCT International Search Report filed Sep. 26, 2011 (9 pages).

* cited by examiner

*Primary Examiner* — Antony M Paul

(57) ABSTRACT

An excavator drive system wherein one of a pair of propulsion motors shares one of a pair of inverter power sources with another of a pair of motors dedicated to crowd and hoist motions. A pair of non-volatile bi-state switches, triggered under control of a controller, allow sharing of inverters between hoist and propel 1 motors. Another pair of switches allows inverter sharing between propel 2 and crowd motors. Each pair of switches enables change over and power transfer from one of the paired motors to the other motor. The bi-state switches enable quicker transfer of power between motors than transfer switches employing external motor-powered mechanical transfer linkages. Bi-state transfer switches also maintain transfer coupling status in the event of power failure to the switch actuators, allowing an excavator operator to continue the drive function in operation prior to the switch power failure.

25 Claims, 5 Drawing Sheets

EXCAVATOR DRIVE SYSTEM WITH BI STATE MOTOR TRANSFER SWITCHES

BACKGROUND OF THE DISCLOSURE

1. Field of the Invention

The invention relates to excavator drive systems that control excavator propulsion and bucket motion, and in particular motor transfer switches in such drive systems that selectively couple and decouple drive system motors from shared power sources.

2. Description of the Prior Art

Excavator systems, such as electric shovels and drag lines, are critical high power-consuming equipment in the mining industry. As shown in FIGS. 1 and 2, a known shovel system 10 includes a chassis to which are mounted a pair of tracks 12, 14, a boom 16, a dipper arm 18 and a bucket 20. The excavator 10 has a drive system 30 that enables the designated individual motions referred to as hoist, swing, crowd and propel. Those motions are typically powered by multi-phase AC asynchronous motors 40, 42, 44, 46 that are fed by active front end rectified inverters 32 including IGBT vector control. The inverters 32 reduce the harmonics associated with rectification and provide reactive power support at the shovel's point of common coupling (PCC).

The known excavator drive system 30, shown in FIG. 2, has a propel motion system comprising two independently controlled motors 44, 46 powering respective tracks 12, 14. For descriptive simplicity only a single phase of the multi-phase system is shown, it being readily apparent to those skilled in the art that the other phases have similar construction, function and operation. Transfer switches 34 allow sharing of power source inverters 32 between pairs of crowd and propel 1 motion motors 40, 44 and hoist and propel 2 motion motors 42, 46. Each transfer switch 34 is controlled by a programmable logic controller (PLC) 38; they communicate with each other via communications bus 39 or other known communications pathway.

Typical known industrial transfer switches 34 have a motor module 35 that drives multiple switch modules 36 (often known multi-phase motor contactors) through an external mechanical linkage. The switch modules 36 typically are single pole double throw or double pole, double throw motor contactors having external mechanical "on"/"off" switches 37. The motor module 35 mechanically interfaces with the switch module external mechanical switches 37 and functionally enables remote mechanical actuation under control of a programmable logic controller (PLC) 38. As shown in FIG. 2 a representative motor module 35 includes a reversable motor 35A driving a mechanical linkage (here pinion 35B engaging rack 35C interface with on/off switches 37).

The known commercialized motor module 35, being a mechanical device, typically needs greater than 2 seconds to perform a motor transfer, due to system response phase lag. Quicker transfer time is desired to increase excavator productivity. As an example, if in a typical operational hour there are 5 transfers between propel and digging modes and each transfer expends 3 seconds, that results in a loss of 30 seconds per hour. The expended time presents an opportunity to gain productivity of an additional digging cycle with an expensive piece of earthmoving equipment.

In the event of loss of power to the transfer switch 34, some of the known switch module contactors 36 lose power and default to a driven motor "off" condition, in which case the excavator ceases motion. If prior to transfer switch 34 power loss the excavator 10 is performing a translation or digging motion the operation ceases, even though the excavator operator did not need to transfer motor power. If the prior state of motor connection was preserved after a transfer switch 34 power failure, as is possible with some known commercialized devices, the operator could continue excavator operation in that prior connection status mode.

Thus, a need exists in the art for an excavator, including an excavator drive system that is capable of transferring electric power from one drive motor to another drive motor without mechanical external transfer linkages and auxiliary motor drives that typically have long transfer time lags from initiation of a transfer command to completion of the power transfer.

Another need exists in the art for an excavator, including an excavator drive system, that does not cause disruption of power to drive system motors due to a transmit switch power failure, so that an operator can continue to use the excavator drive system in the manner preceding the power failure.

SUMMARY OF THE INVENTION

Accordingly, an object of the present invention is to create an excavator, including an excavator drive system that is capable of transferring electric power from one drive motor to another drive motor quicker than presently done using known transfer switches having mechanical external transfer linkages and auxiliary motor drives.

Another object of the present invention is to create an excavator, including an excavator drive system, that does not cause disruption of power to drive system motors due to a transmit switch power failure.

These and other objects are achieved in accordance with the present invention by excavator drive systems of the present invention, as well as excavators incorporating such drive systems. Excavator drive systems of the present invention have a first motor for powering an excavator bucket and a second motor for powering an excavator propulsion system and a power source for the motors. A first non-volatile bi-state switch, having a motorized electromagnetic actuator, selectively couples and decouples the first motor to the power source. Similarly, a second non-volatile bi-state switch, having a motorized electromagnetic actuator for selectively couples and decouples the second motor to the power source. At least one relay device controlling energization of the electromagnetic actuators is electrically coupled to at least one of the respective electromagnetic actuators. A controller, such as a programmable logic controller (PLC), is electrically coupled to and in communication with the at least one relay device. The PLC transmits control signals to the at least one relay device, for selective coupling of one of the motors to the power source while decoupling the other motor from the power source.

In practicing the present invention, the motors and power source often are multi-phase, and in which case the bi-state switches have separate poles for each phase. All the poles of each separate bi-state switch may be coupled to a common relay device controlling energization of electromagnetic actuators in each pole, so that all phases are switched simultaneously. The bi-state switches may incorporate a status indicator that communicates to the controller coupling or uncoupling state status. The controller may compare an intended bi-state switch coupling state with the state indicated by the status indicator and recognize a fault when the compared states differ. Upon recognition of a compared state difference fault the controller may re-synchronize the bi-state switches so that one couples its respective motor and power source while the second decouples its respective motor and power source. Desirably, the respective non-volatile bi-state switches are capable of holding a coupled or decoupled state until its electromagnetic actuator is energized again by its respective relay.

Another aspect of the present invention is directed to application in an excavator system, comprising a chassis having a drive system for moving a propulsion system including a pair of first and second tracks, a boom and an excavator bucket coupled to the boom. The excavator drive system includes a first motor for powering the excavator bucket hoist motion; a second motor for powering the propulsion system first track; a third motor for powering the excavator bucket hoist crowd motion; and a fourth motor for powering the propulsion system second track. The drive system has a first power source for the first and second motors and a second power source for the third and fourth motors. The drive system further has first non-volatile bi-state switch, having a motorized electromagnetic actuator for selectively coupling and decoupling the first motor to the first power source; and a second non-volatile bi-state switch, having a motorized electromagnetic actuator for selectively coupling and decoupling the second motor to the first power source. The drive system has a third non-volatile bi-state switch, having a motorized electromagnetic actuator for selectively coupling and decoupling the third motor to the second power source and a fourth non-volatile bi-state switch, having a motorized electromagnetic actuator for selectively coupling and decoupling the fourth motor to the second power source. At least one relay device controlling energization of electromagnetic actuators is electrically coupled to at least one of the respective electromagnetic actuators. A controller is electrically coupled to and in communication with the at least one relay device, transmitting control signals thereto, for selective coupling of one of the first or second motors to the first power source while decoupling the other motor from the first power source and for selective coupling of the third or fourth motors to the second power source while decoupling the other motor from the second power source.

The drive system may have multi-phase motors, inverter power sources and bi-state switches having separate poles for each phase. All the poles of each separate bi-state switch may be coupled to a common relay device controlling energization of electromagnetic actuators in each pole, so that all phases are switched simultaneously. The bi-state switches may incorporate a status indicator that communicates to the controller coupling or uncoupling state status. The controller may compare an intended bi-state switch coupling state with the state indicated by the status indicator and recognize a fault when the compared states differ. Upon recognition of a "compared states differ" fault the controller may re-synchronize the bi-state switches so that one couples its respective motor and power source while the second decouples its respective motor and power source. Desirably, the respective non-volatile bi-state switches are capable of holding a coupled or decoupled state until its electromagnetic actuator is energized again by its respective relay.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in excavator drive systems. The drive system of the present invention provides for quicker power transfer from one paired drive motor to the other motor, reducing transfer time from multiple seconds to a fraction of a second. The drive system of the present invention also preserves transfer status in the event of power failure to the non-volatile bi-state transfer switches electromagnetic actuators.

Drive System Architecture and Functional Overview

Figure 1:
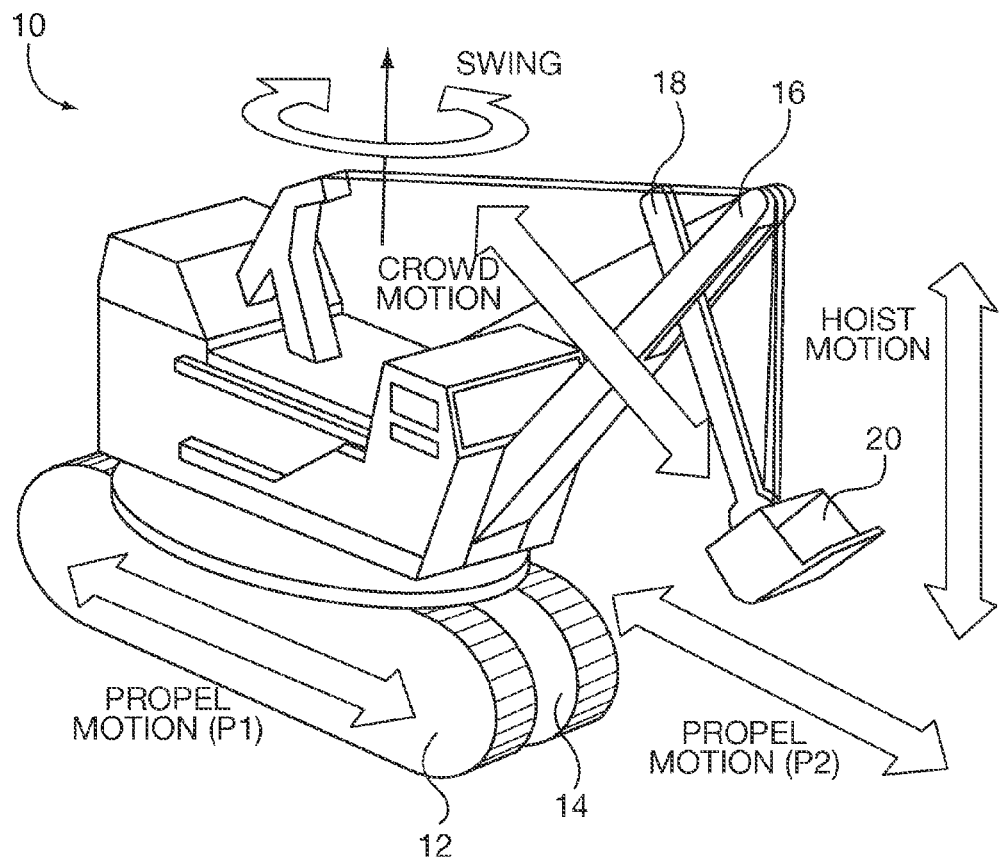
FIG. 1 shows a schematic perspective view of an excavator and its ranges of motion.
Figure 2:
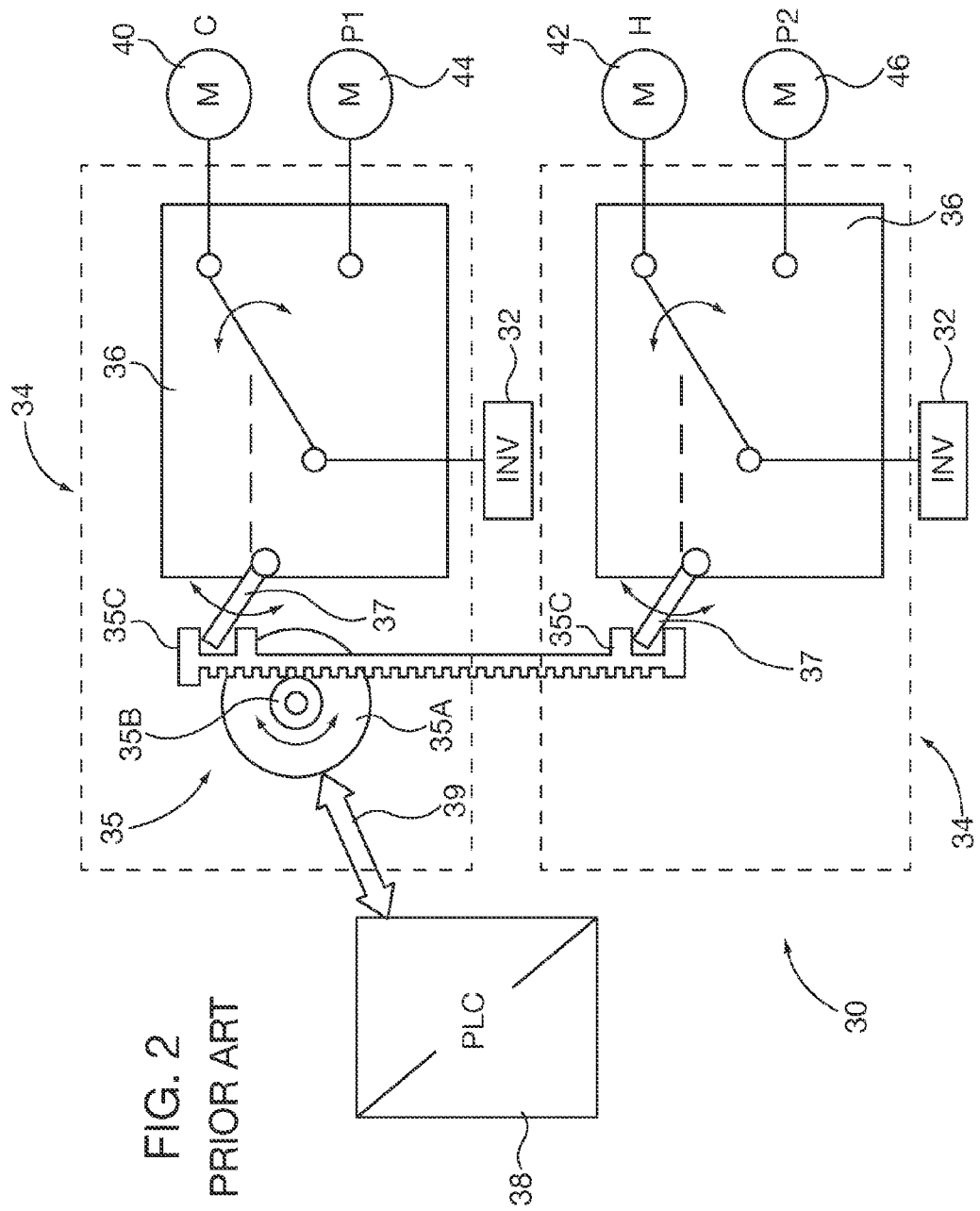
FIG. 2 is a schematic of a known excavator drive system.
Figure 3:
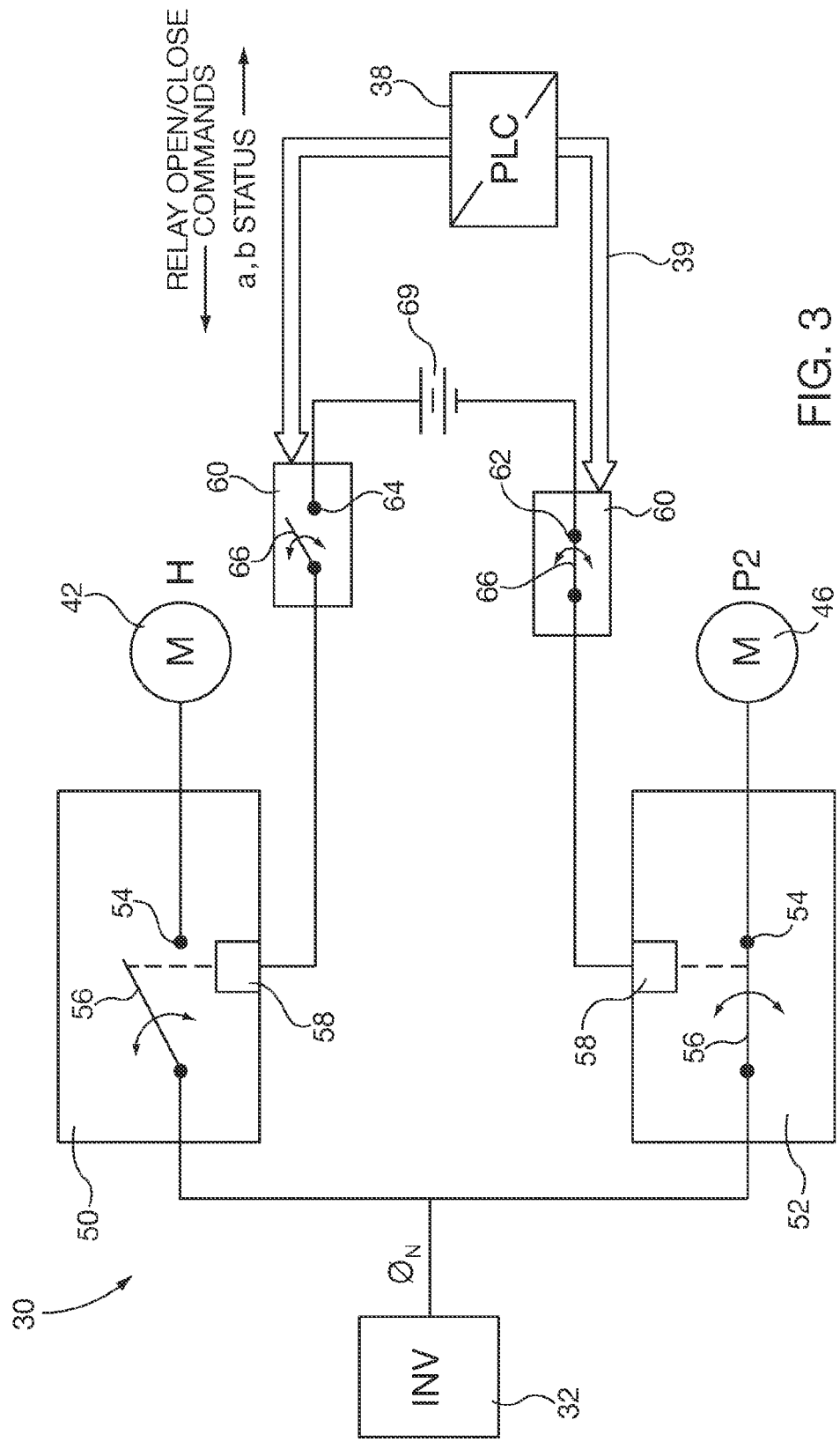
FIG. 3 is a partial schematic diagram of an excavator drive system of the present invention, simplified to show a single current phase for two motors and their shared power system.

FIG. 3 shows a single phase ($\Phi_N$) embodiment of the drive system 30 of the present invention. Alternating current power from inverter 32 is transferred between motor 42, driving hoist motion H of the excavator 10 bucket 20 and motor 46, driving propulsion motion P2 of the excavator tread 14, depending upon whether the excavator is being propelled between digging locations or is digging.

Power transfer between the motors 42, 46 is accomplished with a pair of respective first and second disconnect switches 50, 52, designed to connect and isolate electrical circuits, rather than by known externally motorized transfer switches, the disadvantages of which were previously described. Each of the disconnect switches 50, 52 is a single pole single throw switch. In multiple phase applications a single pole switch can be dedicated to each phase, such as by ganging them together, or alternatively, a multi-phase single throw switch sharing a common housing can be constructed.

Single pole disconnector switches 50, 52 have a fixed contact 54 and a moving contact 56 for selectively coupling and decoupling the inverter power source 32 to the respective motors 42, 46. The moving contact 56 is opened and closed with a motorized mechanism including an electromagnetic actuator, schematically shown as box and dashed line 58. The disconnect switch 50, 52 operates by charging an electromagnetic coil in the actuator 58, and is both non-volatile and bi-state. In other words, the switch can only be fully opened or fully closed state, and it "holds" state until caused to change state by the actuator 58. The same actuator pulse is used to open and to close the contacts 54, 56 sequentially as needed. In the closed position/state the contacts 54, 56 are mechanically locked. In opened contact position/state a spring holds the status.

No externally applied electrical holding power is necessary to maintain switch 50, 52 state. In the event that actuator 58 energization power to either of the switches 50, 52 is disrupted, the affected switch will hold its pre-disruption state. Thus, unlike previously known transfer switches, the switches 50, 52 of the present invention do not decouple either of motors 42, 46 from the inverter power source 32 in the event of switch power disruption. An exemplary disconnect switch suitable for practicing the present invention is a model XMS disconnector switch sold by Secheron SA of Geneva, Switzerland.

Switching state of the non-volatile bi-state disconnect switches 50, 52 is changed by energizing the respective actuators 58 in each switch by means of relay devices 60, each of which includes a fixed contact 64 and a moving contact 66. Relay power supply 69 provides sufficient power to energize the bi-state switch 50, 52 actuators. Exemplary output specifications for power supply 69 are 5 kW with 125 V DC and (in worst case) 35 A to operate the motor transfer switches 50, 52 reliably in a temperature range of −40° C. to +50° C., with margin for a ±10% variation of the power supply output. The bi-state switches 50, 52 are capable of indicating their respective coupled status (i.e., opened or closed), such as through known "normally open" (N.O.) and "normally closed" (N.C.) auxiliary contacts status indicators that are in communication with the PLC 38 input ports via communications pathway 39. The PLC 38 in turn causes the relay devices 60 to energize the actuators 58 in the respective bi-state switch pairs 50, 52.

While the exemplary embodiments of the bi-state switches 50, 52 and relay devices 60 describe electromechanical components, one skilled in the art may substitute solid state switching components to perform either or both of their respective functions.

Figure 4:
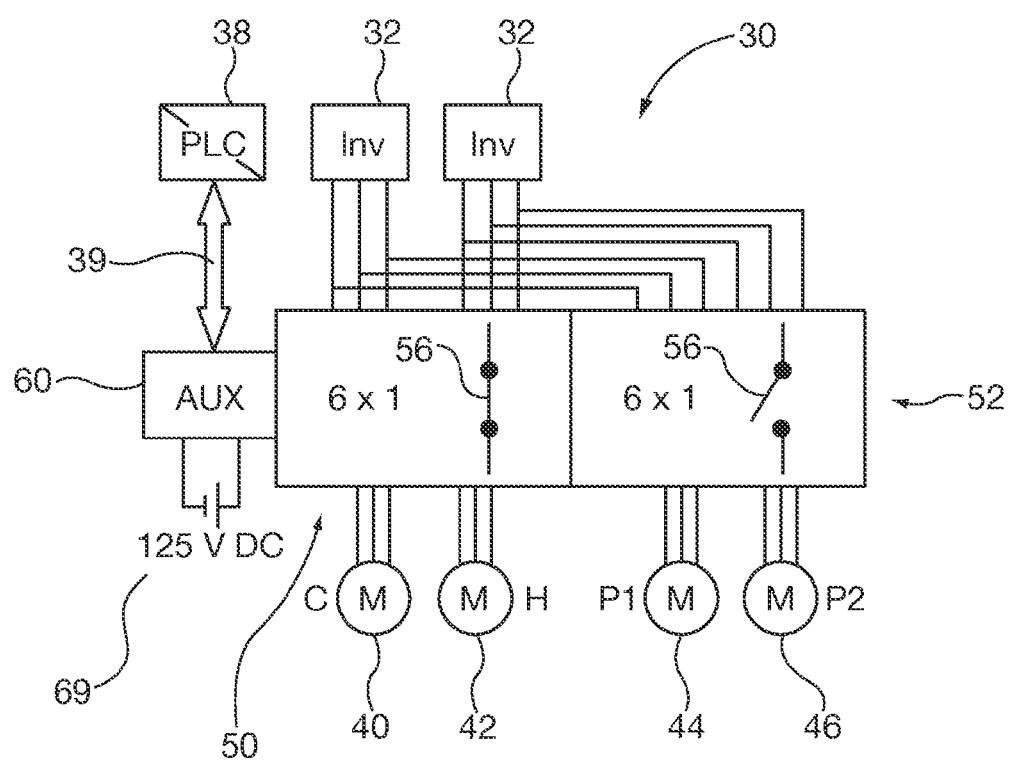
FIG. 4 is a schematic block diagram of an excavator drive system the present invention.
Figure 5:
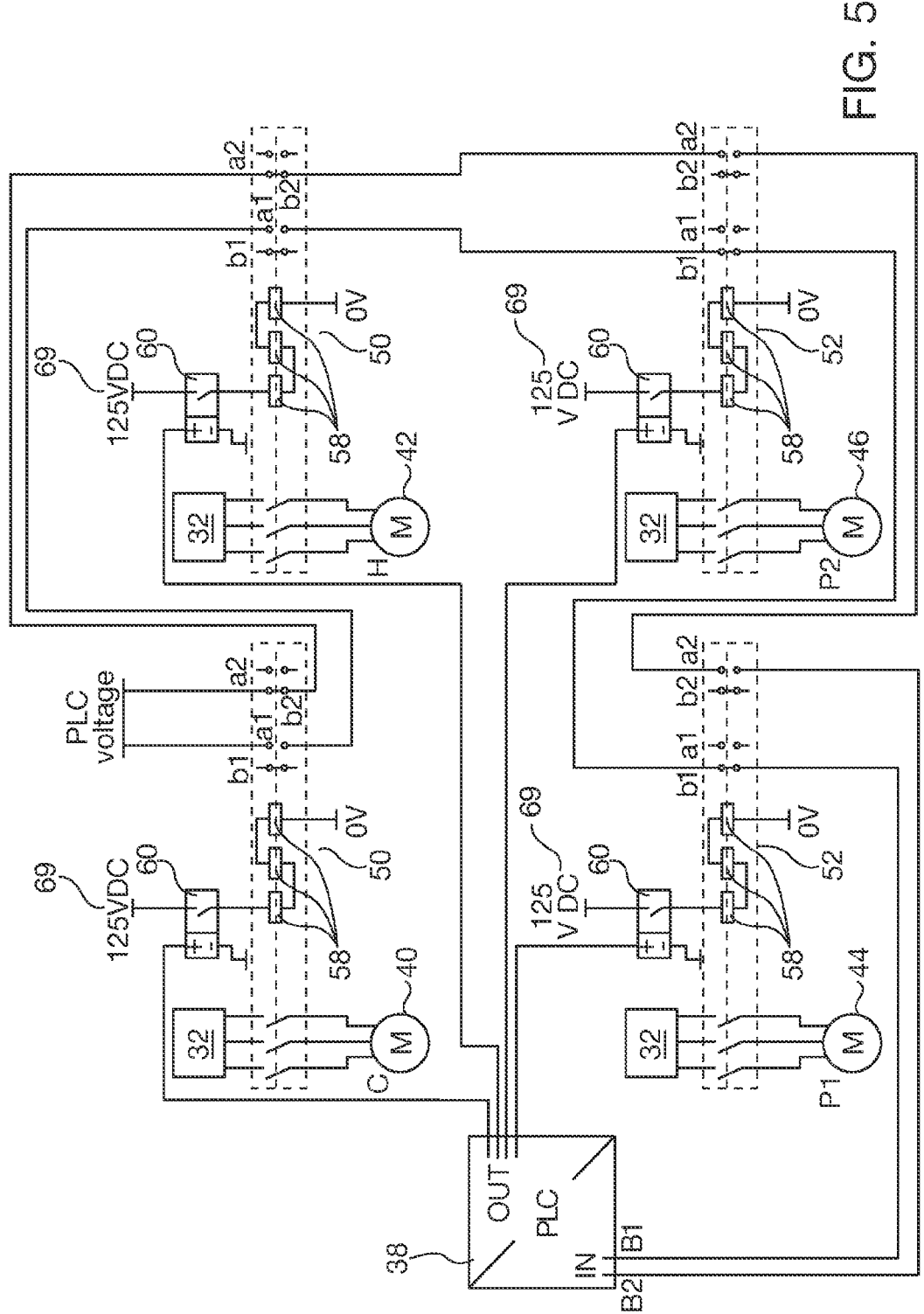
FIG. 5 is a schematic diagram of an exemplary excavator drive system of the present invention, showing four motors that provide the excavator ranges of motion shown in FIG. 1 and their two shared power sources.

FIGS. 4 and 5 show application of the present invention to a three-phase excavator drive system 30, having two separate pairs of drive motors 40, 44 for crowd and propulsion 1 drive and motors 42, 46 for hoist and propulsion 2 drive. As each bi-state disconnector switch 50, 52 is a single pole disconnector, 12 single switches will be required to achieve 12 phases (i.e., four motors each having three phases). Each of the motor pairs is selectively coupled to its corresponding inverter 32 power source through pairs of bi-state switches 50, 52. Functionally in each phase, the individual single-pole single throw switches 50, 52 functions as a single pole double throw change-over switch that transfers power from one paired motor to the other. In operation, as shown in FIG. 4, six bi-state disconnector switches are in closed position (e.g., crowd/hoist functions) and six are in open position (e.g., their corresponding pair counterpart propulsion 1/propulsion 2 functions).

As previously described, the bi-state switches 50, 52 are capable of indicating their respective coupled status (i.e., opened or closed) such as through known "normally open" (N.O.) and "normally closed" (N.C.) auxiliary contacts b1, b2 that are in communication with the PLC 38 via communications pathway 39. If each switch 50 or 52 in each of the three motor phases has its own dedicated relay device 60 and the PLC 38 is intended to monitor status of each individual phase, a total of 12 monitoring PLC inputs and 12 outputs (total 24) are required. While 24 separate monitoring inputs/outputs may be accommodated with an appropriately sized PLC input/output interface card, it is possible to reduce the switches 50, 52 control and monitoring interfaces down to 4 PLC control outputs and 2 inputs.

As shown in FIG. 5, the bi-state switches 50, 52 are grouped into four separate operational blocks corresponding to each of the drive motors 40, 42, 44, 46. Each block of three mechanically-linked, single phase bi-state switches 50, 52 have the same "open" or "closed" status and shares one common relay device 60. A single PLC 38 output causes the relay device 60 to energize all bi-state switch actuators 58 in its block.

In FIG. 5, the 2 PLC inputs B1 and B2 are used to monitor the status. While the blocks C (Crowd) and H (Hoist) are closed and P1 (Propel 1) and P2 (Propel 2) are opened B1=1 and B2=0. While the blocks P1 and P2 are closed and C and H are opened B1=0 and B2=1; B1=0 and B2=0 indicates a fault. It is not possible to have both B1=1 and B2=1. In other words, it is exactly known whether the machine is in Crowd/Hoist mode, in Propel mode or there is a fault situation.

The Logical Operation Sequence is presented below in Tables I and II. With the mechanical linking of each bi-state switch 50, 52 blocks there are 16 possible statuses (Case A-P) for the main contacts 54, 56 and the auxiliary contacts b1, b2. For each case, the status of the auxiliary contacts and what signal is given to the PLC (B1, B2) is shown. Normal operation is change over. That means switchover between Case B and Case C. Otherwise there is some kind of fault. Not every fault is critical, e.g., at the beginning all switches 50, 52 are open so there is just a synchronization required.

For all fault cases the same special switching sequence is started to get the bi-state switches 50, 52 back to the cases B or C. This sequence makes it possible to resynchronize without knowing the exact status. Whether there is loss of synchronization or a power failure, the non-volatile bi-state switches 50, 52 will continue to maintain their existing status, so that excavator operation can continue until re-synchronization or power supply resumption.

The status of the main contacts is shown in Table I. There are 16 cases indicated as case A to case P.

TABLE I

STATUS OF MAIN CONTACTS

| Status | Case | Crowd | Propel 1 | Hoist | Propel 2 |
| --- | --- | --- | --- | --- | --- |
| Start | A | 0 | 0 | 0 | 0 |
| C + H working | B | 1 | 0 | 1 | 0 |
| P1 + P2 working | C | 0 | 1 | 0 | 1 |
| C + H working, P1 error | D | 1 | 1 | 1 | 0 |
| C + H working, P2 error | E | 1 | 0 | 1 | 1 |
| C + H working, C error | F | 0 | 0 | 1 | 0 |
| C + H working, C + P1 error | G | 0 | 1 | 1 | 0 |
| C + H working, C + P2 error | H | 0 | 0 | 1 | 1 |
| C + H working, H error | I | 1 | 0 | 0 | 0 |
| C + H working, H + P1 error | J | 1 | 1 | 0 | 0 |
| C + H working, H + P2 error | K | 1 | 0 | 0 | 1 |
| P1 + P2 working, P1 error | L | 0 | 0 | 0 | 1 |
| P1 + P2 working, P2 error | M | 0 | 1 | 0 | 0 |
| P1 + P2 working, C error | N | 1 | 1 | 0 | 1 |
| P1 + P2 working, H error | O | 0 | 1 | 1 | 1 |
| All ON | P | 1 | 1 | 1 | 1 |

As has been described above, each block of 3 bi-state disconnect switches 50, 52 has two auxiliary contacts a1 or b1, a2 or b2. As an example, the status of contacts for Crowd (a1, b2) and Propel 1 (a2, b1) are shown in the Table II. Similar status would exist for Hoist and Propel 2 blocks.

TABLE II

STATUS OF AUXILIARY CONTACTS

| Status | Case | Crowd (a1) | Crowd (b2) | Propel 1 (a2) | Propel 1 (b1) |
|---|---|---|---|---|---|
| Start | A | 0 | 1 | 0 | 1 |
| C + H working | B | 1 | 0 | 0 | 1 |
| P1 + P2 working | C | 0 | 1 | 1 | 0 |
| C + H working, P1 error | D | 1 | 0 | 1 | 0 |
| C + H working, P2 error | E | 1 | 0 | 0 | 1 |
| C + H working, C error | F | 0 | 1 | 0 | 1 |
| C + H working, C + P1 error | G | 0 | 1 | 1 | 0 |
| C + H working, C + P2 error | H | 0 | 1 | 0 | 1 |
| C + H working, H error | I | 1 | 0 | 0 | 1 |
| C + H working, H + P1 error | J | 1 | 0 | 1 | 0 |
| C + H working, H + P2 error | K | 1 | 0 | 0 | 1 |
| P1 + P2 working, P1 error | L | 0 | 1 | 0 | 1 |
| P1 + P2 working, P2 error | M | 0 | 1 | 1 | 0 |
| P1 + P2 working, C error | N | 1 | 0 | 1 | 1 |
| P1 + P2 working, H error | O | 0 | 1 | 1 | 0 |
| All ON | P | 1 | 0 | 1 | 0 |

In the above tables, status 1 indicates a contact is closed and status 0 indicates a contact is open. To implement the excavator drive system 30 motor power transfer, the PLC 38 is programmed to enable the system to perform the changeover and the fault handling sequences. The PLC 38 has to hold the output signals for a defined pulse duration to assure completion of the bi-state switch 50, 52 state change. This pulse duration time defines the transfer time of the drive system 30.

EXPERIMENTAL EXAMPLES

Two bi-state switches 50, 52 have been combined to create a single phase, single pole double throw switch, in order to confirm feasibility of the present invention for application in excavator drive systems. Six such units need to be combined to meet the requirements of an excavator drive system three-phase propel 1-propel 2/hoist-crowd transfer switch. The experimental testing determined transfer switch operational and performance parameters, and confirmed that the present invention is capable of performing transfer operations in fractions of a second rather than multiple seconds expended in known transfer switches.

A. Test Setup at Ambient Temperature:
Two single pole non-volatile bi-state Model XMS disconnect switches (switch 50 switch 52)
Power supply: 27.6 V/48.0 V
Logic circuit voltage: 27.6 V/27.6
Timer relays: CM1/UC24-60V
Power relays: Omron Model G9 EB-1-B and Siemens Model 3TH2022-0BB4
B. Measurements with 27.6 V, Switch 50 Opening and Switch 52 Closing
The measurements are for minimal pulse duration with 27.6 V control supply. During operation, both the bi-state switches exhibited similar behavior, i.e., switch 50 opening, switch 52 closing was similar to switch 50 closing, switch 52 opening.
Pulse duration: 504 ms
Beginning of the pulse until closing of 50: 184 ms
Beginning of the pulse until opening of 52: 534 ms
Coil current maximum: 6.9 A
C. Measurements with 48 V, Switch 50 Opening and Switch 52 Closing
The measurements are for minimal pulse duration with 48 V control supply. This is the best possible switching time achieved.
Pulse duration: 84.4 ms
Beginning of the pulse until opening of 50: 116 ms
Coil current maximum: 10.6 A
One important finding was that operating at the higher end of the rated actuation coil voltage of actuator 58 resulted in shorter switching times. Table III and Table IV show the comparison of results for 27.6 V and 48 V.

TABLE III

RESULTS FOR 27.6 V

|  | Pulse [ms] | $t_A$ [ms] | $t_B$ [ms] | $I_c$ [A] |
|---|---|---|---|---|
| I | 504 | 184 | 534 | 6.9 |
| II | 500 | 532 | 178 | 6.7 |
| III | 496 | 146 | — | 6.7 |
| IV | 496 | 522 | — | — |
| V | 223 | — | 250 | 6.6 |

TABLE IV

RESULTS FOR 48 V

|  | Pulse [ms] | $t_A$ [ms] | $t_B$ [ms] | $I_c$ [A] |
|---|---|---|---|---|
| I | — | — | — | — |
| II | 500 | 528 | — | 12.8 |
| III | — | — | — | — |
| IV | — | — | — | — |
| V | 84.4 | 116 | — | 10.6 |

In the tables:
$t_A$: time from beginning of the pulse till action of switch 50
$t_B$: time from beginning of the pulse till action of switch 52
$I_c$: coil current maximum
I: 50 closing, 52 opening
II: 50 opening, 52 closing
III: Synchronization 50 closing
IV: Synchronization 50 opening
V: Minimal pulse duration

V. CONCLUSIONS

One of the important findings from the test results was that opening a bi-state disconnect switch takes much longer than closing the same switch. Therefore the opening time is defined in the transfer switch time. The minimal transfer switch time which could be found on the actual bi-state switch at a supply of 48 V is 116 ms. Synchronization is necessary initially between the paired switches 50, 52 and after a fault. The internal logic connections of the auxiliary contacts b1, b2 were proved and verified.

Advantages of the present invention over known external mechanical linkage transfer switches include fast transfer time of fractions of a second compared to many seconds, simple logic, lack of holding energy input to maintain non-volatile bi-state switch state, relatively simpler robust construction and very minimal maintenance. These application advantages of the present invention have to be weighed by those skilled in the art with potential increased switching noise, size, weight, higher actuator actuation coil current needs, and additional power relays to accomplish the switching status logic implementation described herein that minimizes PLC switch status inputs (or use a PLC I/O interface that accommodates more inputs). It is believed that in most excavator drive system motor transfer applications, those skilled in the art will appreciate that the advantages of the present invention are preferable to excavator drive systems using known transfer switches.

Although various embodiments which incorporate the teachings of the present invention have been shown and described in detail herein, those skilled in the art can readily devise many other varied embodiments that still incorporate these teachings.

What is claimed is:

1. An excavator drive system, comprising:
   a first motor for powering an excavator bucket;
   a second motor for powering an excavator propulsion system;
   a power source for the motors;
   a first non-volatile bi-state switch, having a motorized electromagnetic actuator for selectively coupling and decoupling the first motor to the power source;
   a second non-volatile bi-state switch, having a motorized electromagnetic actuator for selectively coupling and decoupling the second motor to the power source;
   at least one relay device for controlling energization of electromagnetic actuators, electrically coupled to at least one of the respective electromagnetic actuators; and
   a controller electrically coupled to and in communication with the at least one relay device, transmitting control signals thereto for selective coupling of one of the motors to the power source while decoupling the other motor from the power source.

2. The system of claim 1, wherein the motors and power source are multi-phase and the bi-state switches have separate poles coupled to each separate phase of the respective motors and power source.

3. The system of claim 2, wherein all the poles of each respective bi-state switch are coupled to a common relay device controlling energization of electromagnetic actuators in said switch.

4. The system of claim 2, wherein each bi-state switch pole comprises a separate single pole bi-state switch coupled to a common relay device controlling energization of electromagnetic actuators in each of said single pole switches.

5. The system of claim 1, wherein each of the bi-state switches has a status indicator that communicates to the controller coupling or uncoupling state status.

6. The system of claim 5, wherein the controller compares an intended bi-state switch coupling state with the state indicated by the status indicator and recognizes a fault when the compared states differ.

7. The system of claim 6, wherein the controller re-synchronizes the pair of first and second bi-state switches after fault recognition, so that one of the switches couples its respective motor and power source while the second decouples its respective motor and power source.

8. The system of claim 1, wherein the non-volatile bi-state switches hold a coupled or decoupled state until its electromagnetic actuator is re-energized by its respective relay.

9. An excavator system, comprising:
   a chassis having a propulsion system, a boom and an excavator bucket coupled to the boom;
   a first motor for powering the excavator bucket;
   a second motor for powering the propulsion system;
   a power source for the motors;
   a first non-volatile bi-state switch, having a motorized electromagnetic actuator for selectively coupling and decoupling the first motor to the power source;
   a second non-volatile bi-state switch, having a motorized electromagnetic actuator for selectively coupling and decoupling the second motor to the power source;
   at least one relay device for controlling energization of electromagnetic actuators, electrically coupled to at least one of the respective electromagnetic actuators; and
   a controller electrically coupled to and in communication with the at least one relay device, transmitting control signals thereto for selective coupling of one of the motors to the power source while decoupling the other motor from the power source.

10. The system of claim 9, wherein the motors and power source are multi-phase and the bi-state switches have separate poles coupled to each separate phase of the respective motors and power source.

11. The system of claim 10, wherein all the poles of each respective bi-state switch are coupled to a common relay device controlling energization of electromagnetic actuators in said switch.

12. The system of claim 10, wherein each bi-state switch pole comprises a separate single pole bi-state switch coupled to a common relay device controlling energization of electromagnetic actuators in each of said single pole switches.

13. The system of claim 9, wherein each of the bi-state switches has a status indicator that communicates to the controller coupling or uncoupling state status.

14. The system of claim 13, wherein the controller compares an intended bi-state switch coupling state with the state indicated by the status indicator and recognizes a fault when the compared states differ.

15. The system of claim 14, wherein the controller re-synchronizes the pair of first and second bi-state switches after fault recognition, so that one of the switches couples its respective motor and power source while the second decouples its respective motor and power source.

16. The system of claim 9, wherein the non-volatile bi-state switches hold a coupled or decoupled state until its electromagnetic actuator is re-energized by its respective relay.

17. An excavator system, comprising:
   a chassis having a propulsion system including a pair of first and second tracks, a boom and an excavator bucket coupled to the boom;

a first motor for powering the excavator bucket hoist motion;

a second motor for powering the propulsion system first track;

a third motor for powering the excavator bucket hoist crowd motion;

a fourth motor for powering the propulsion system second track;

a first power source for the first and second motors;

a second power source for the third and fourth motors;

a first non-volatile bi-state switch, having a motorized electromagnetic actuator for selectively coupling and decoupling the first motor to the first power source;

a second non-volatile bi-state switch, having a motorized electromagnetic actuator for selectively coupling and decoupling the second motor to the first power source;

a third non-volatile bi-state switch, having a motorized electromagnetic actuator for selectively coupling and decoupling the third motor to the second power source;

a fourth non-volatile bi-state switch, having a motorized electromagnetic actuator for selectively coupling and decoupling the fourth motor to the second power source;

at least one relay device for controlling energization of electromagnetic actuators, electrically coupled to at least one of the respective electromagnetic actuators; and a controller electrically coupled to and in communication with the at least one of relay device, transmitting control signals thereto for selective coupling of one of the first or second motors to the first power source while decoupling the other motor from the first power source and for selective coupling of the third or fourth motors to the second power source while decoupling the other motor from the second power source.

18. The system of claim 17, wherein the motors and power sources are multi-phase and the bi-state switches have separate poles coupled to each separate phase of the respective motors and power sources.

19. The system of claim 18, wherein all the poles of each respective bi-state switch are coupled to a common relay device controlling energization of electromagnetic actuators in said switch.

20. The system of claim 18, wherein each bi-state switch pole comprises a separate single pole bi-state switch coupled to a common relay device controlling energization of electromagnetic actuators in each of said single pole switches.

21. The system of claim 17, wherein each of the bi-state switches has a status indicator that communicates to the controller coupling or uncoupling state status.

22. The system of claim 21, wherein the controller compares an intended bi-state switch coupling state with the state indicated by the status indicator and recognizes a fault when the compared states differ.

23. The system of claim 22, wherein the controller re-synchronizes the bi-state switches after fault recognition, so that intended coupling and decoupling is accomplished.

24. The system of claim 17, wherein the respective non-volatile bi-state switches hold a coupled or decoupled state until its electromagnetic actuator is re-energized by its respective relay.

25. The system of claim 17, wherein:

the motors and power sources have three phases and the bi-state switches have separate poles coupled to each separate phase of its respective motor and power source;

each of the first through fourth bi-state switches has a separate relay device to which all its respective poles are coupled, for controlling energization of electromagnetic actuators in each of said poles, each bi-state switch having a status indicator that communicates to the controller coupling or uncoupling state status; and the controller is a programmable logic controller having a separate output in communication with each of the respective relay devices for transmitting said control signals thereto, and at least two inputs for receiving status communications from the status indicator.

\* \* \* \* \*